(12) United States Patent
Hayasaki

(10) Patent No.: US 8,289,546 B2
(45) Date of Patent: Oct. 16, 2012

(54) CONTROL DEVICE, IMAGE FORMING APPARATUS, METHOD OF CONTROLLING IMAGE FORMING APPARATUS, AND RECORDING MEDIUM

(75) Inventor: Makoto Hayasaki, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 980 days.

(21) Appl. No.: 12/314,356

(22) Filed: Dec. 9, 2008

(65) Prior Publication Data

US 2009/0148006 A1    Jun. 11, 2009

(30) Foreign Application Priority Data

Dec. 11, 2007  (JP) ................. 2007-319970

(51) Int. Cl.
 *G06K 3/12* (2006.01)
 *G06K 9/00* (2006.01)
 *G06K 9/62* (2006.01)
(52) U.S. Cl. ............. 358/1.15; 382/118; 382/159
(58) Field of Classification Search ........... 382/118, 382/159; 358/1.1
See application file for complete search history.

(56) References Cited

U.S. PATENT DOCUMENTS

| 7,586,635 B2* | 9/2009 | Maeda et al. ............... 358/1.15 |
| 2003/0063795 A1* | 4/2003 | Trajkovic et al. ........... 382/159 |
| 2005/0185215 A1 | 8/2005 | Nishizawa et al. |
| 2006/0056666 A1 | 3/2006 | Mizutani et al. |
| 2006/0066891 A1* | 3/2006 | Ikeda et al. ................ 358/1.15 |
| 2007/0036398 A1* | 2/2007 | Chen .......................... 382/118 |

FOREIGN PATENT DOCUMENTS

| JP | 11-144060 | 5/1999 |
| JP | 2006-177086 A | 7/2006 |

OTHER PUBLICATIONS

Shigeru Akamatsu, "Computer Recognition of Human Face—A Survey—," The transactions of the Institute of Electronics, Information and Communication Engineers A, vol. J80-A, No. 8, Aug. 1997, pp. 1215-1230 and the partial translation thereof (3 pages).

* cited by examiner

*Primary Examiner* — Chan S Park
*Assistant Examiner* — Ha Le
(74) *Attorney, Agent, or Firm* — Edwards Wildman Palmer LLP; George W. Neuner

(57) ABSTRACT

A control device of the present invention includes: a face position detecting section for detecting a position of a user's face in an image captured by a capturing device; a face recognition processing section for checking a partial image against reference face images, the partial image being at the position detected in the captured image, and extracting a reference face image that matches the face in the partial image; a user authentication section for specifying a user name that corresponds to the extracted reference face image; and a data checking section for (i) checking whether or not a multifunction printer receives print data added with the specified user name, and (ii) if it is confirmed that the multifunction printer receives the print data, operating an image forming section of the multifunction printer to form an image based on the print data. This realizes a control device which (i) authenticates a user in an easy way in which impersonation can be prevented without inconvenient operation, and (ii) prevents another user from accidentally viewing a printed matter.

5 Claims, 10 Drawing Sheets

FIG. 3

| TERMINAL INFORMATION: GENERAL USER |
|---|
| USER NAME : BBBB |
| AUTHENTICATION PASSWORD : ***** |
| DOCUMENT INFORMATION<br>DATA 1 AUTHENTICATION NECESSARY  OFFICE  COLAR<br>xxx APPLICATION  NORMAL QUALITY<br>DOCUMENT NAME:"xxxxx" |
| SETTING FLAG: ON |

| USER ID | USER NAME | AUTHENTICATION PASSWORD | USER REFERENCE INFORMATION |
|---|---|---|---|
| ID0001 | AAAA | ***** | 12098 |
| ID003 | BBBB | ****** | 13258 |
| ID0004 | CCCC | **** | 10298 |
| ID0005 | DDDD | ****** | 11098 |
| ID0007 | FFFF | ****** | 13249 |
| ID0009 | GGGG | ****** | 10098 |
| ID0011 | HHHH | **** | 11123 |
| ID0015 | IIII | ***** | 11234 |
| ... | ... | ... | ... |

13258

USER NAME: BBBB

AUTEHTICATION PASSWORD: *****

AUTHORITY INFORMATION:: GENERAL USER

PERSONAL OPERATION SCREEN PRESENCE/ABSENCE INFORMATION: PRESENCE

PERSONAL OPERATION SCREEN DATA

REFERENCE FAX NUMBER
Mr. A  03·········
Ms. B  06·········
...

REFERENCE E-MAIL ADDRESS
Mr. A  ·····@········.ne.jp
Ms. B  ·····@········.ne.jp
...

FACE AUTEHTICATION REFERENCE IMAGE NUMBER: 12345

DESTINATION REFERENCE INFORMATION

FIG. 7
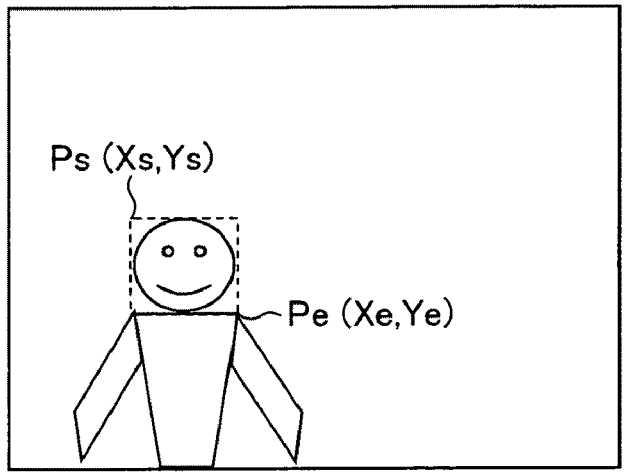
FIG. 8
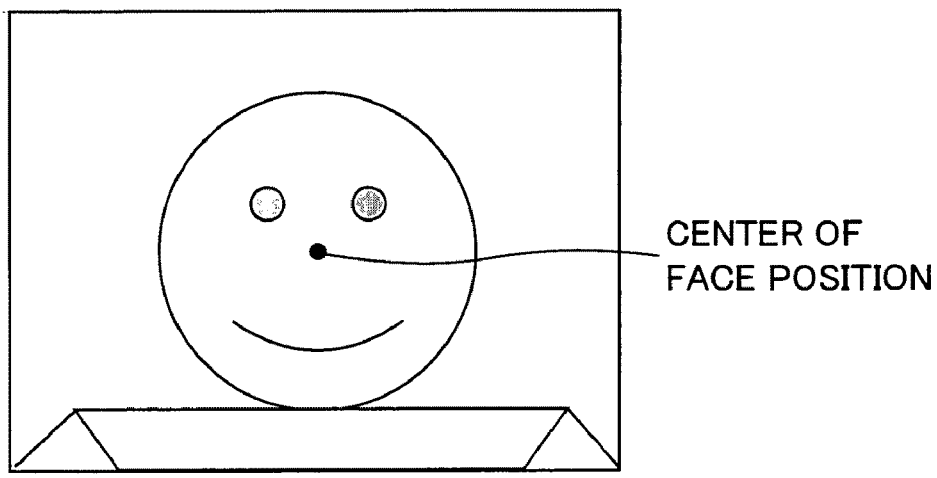
CENTER OF FACE POSITION
FIG. 9
| No | DOCUMENT NAME | USER ID | ... |
|---|---|---|---|
| 1 | xxxxxx | ID0003 | ... |
| 2 | xxxx | ID0003 | ... |
| 3 | xxxxxx | ID0003 | ... |
| 4 | xxx | ID0003 | ... |

CONTROL DEVICE, IMAGE FORMING APPARATUS, METHOD OF CONTROLLING IMAGE FORMING APPARATUS, AND RECORDING MEDIUM

This Nonprovisional application claims priority under 35 U.S.C. §119(a) on Patent Application No. 319970/2007 filed in Japan on Dec. 11, 2007, the entire contents of which are hereby incorporated by reference.

FIELD OF THE INVENTION

The present invention relates to a control device which is applied to an image forming apparatus, and performs user authentication processing

BACKGROUND OF THE INVENTION

A multifunction printer has functions of a printer, a copy machine, a scanner, and the like. In recent years, such technologies are known that provides the multifunction printer with functions of displaying an operation screen for each user, limiting use of functions depending on a user, and performing the other operations. Such a multifunction printer carries out user authentication processing.

As a user authentication method adopted in a multifunction printer, the following two methods have been known conventionally: (a) a user inputs an ID (user identification information), and a password, and the ID and password are authenticated, (b) a user carries a memory card, and user identification information is read from the memory card via non-contact reading, and the user identification information is authenticated (see Patent Document 1 mentioned below).

The method (a), however, requires a user to input the ID and password via key operation, which is inconvenient to the user. On the other hand, the method (b) does not require such operation. However, with the method (b), it is necessary for a user to take measures not to lose, or not to forget to carry the memory card. Further, with either the method (a) or (b), impersonation is possible due to leakage or lending of the user identification information.

Furthermore, there is a possibility that a user's printed matter is accidentally taken by another user, when a plurality of users issues print instructions to a single multifunction printer. This causes trouble, especially in a case where the printed matter is a confidential document.

Japanese Unexamined Patent Publication No. 2005-244489 (Tokukai 2005-244489 (published on Sep. 8, 2005))

SUMMARY OF THE INVENTION

The present invention is made in view of the problems. An object of the present invention is to realize a control device, an image forming apparatus, a method of controlling the image forming apparatus, and a recording medium, each of which (i) authenticates a user in an easy way in which impersonation can be prevented without inconvenient operation, and (ii) prevents another user from accidentally viewing a printed matter.

In order to attain the object, a control device for controlling an image forming apparatus including (a) receiving means for receiving print data from a terminal connected with the image forming apparatus via a network, and (b) image forming means for forming an image of the print data on recording paper, the image forming apparatus being provided with a capturing device for capturing a user who is an operator, the print data being added with user identification information for identifying the user, the control device including: a face position detecting section for detecting a position of a user's face in an image captured by the capturing device; a movement judging section for judging whether or not the user having the face approaches the image forming apparatus, based on temporal changes in position and size of the face, the position and size being detected by the face position detecting section; a face recognition processing section for, in a case where the movement judging section judges that the user approaches the image forming apparatus, (i) checking a partial image against reference face images, the partial image being at the position detected in the captured image by the face position detecting section, the reference face images being users' face images stored in advance; and (ii) extracting a reference face image that matches the face in the partial image; a user specifying section for specifying user identification information that corresponds to the reference face image extracted by the face recognition processing section, the user specifying section specifying the user identification information by referring to primary associated information in which a reference face image is associated with user identification information for identifying a user who has a face indicated by the reference face image; and a data checking section for (i) checking whether or not the receiving means receives the print data added with the user identification information specified by the user specifying section, and (ii) if it is confirmed that the receiving means receives the print data, operating a display device to display a screen showing a list of the print data, and operating the image forming means to form an image based on the print data indicated by a selection instruction inputted into an input device.

With the arrangement, the capturing device captures a user's face when the user comes in front of the multifunction printer. Then, the position of the user's face is detected in the captured image, and the partial image at the position is authenticated against the reference face images. The user is specified with the user identification information corresponding to the reference face image that matches the face in the partial image.

Here, "the reference face image that matches the face in the partial image" does not mean only a case where those perfectly match, but includes a case where those are similar to each other. That is, among the reference face images, the reference face image is closest to the partial image in feature value, and simultaneously, a concordance rate of the feature values of the reference face image and the partial image is equal to or more than a predetermined threshold value.

The user who comes in front of the image forming apparatus is thus authenticated. Thereby, it becomes unnecessary for the user to input an inconvenient password or the like, and also to carry a card or the like.

Further, the data checking section operates the image forming means to form the image based on the print data, when the receiving means receives the print data added with the specified user identification information. Therefore, the printed matter is ejected when the user comes in the vicinity of the image forming apparatus. This can prevents another user from accidentally getting the printed matter.

As such, with the arrangement described above, it becomes possible to realize a control device which (i) authenticates a user in an easy way in which impersonation can be prevented without inconvenient operation, and (ii) prevents another user from accidentally viewing a printed matter.

Further, it is possible to identify a user before the user reaches the image forming apparatus. This makes it possible for the control device and the image forming apparatus to start the processing earlier. For example, in a case where after a user is specified, an image is formed based on the print data added with the user identification information, it is possible to start the image forming processing on an earlier stage. In a case where after a user is specified, a list of the print data added with the user identification information is displayed on the display device, it is possible to start the display processing on an earlier stage.

Furthermore, a user can select/cancel necessary/unnecessary print data among the print data on the print instruction that the user has issued when coming in front of the image forming apparatus. In other words, it is possible to carry out the operation for each print data efficiently.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3 shows an example of print job-related information added to print data that will be sent to the multifunction printer.

FIG. 6 shows an example of a user reference table.

FIG. 7 illustrates a rectangular region circumscribing an outline of a face in an image captured by a capturing device, and start and end points of the region.

FIG. 8 illustrates an image captured by the capturing device when a user is operating the multifunction printer.

FIG. 9 shows a list of print data.

DESCRIPTION OF THE EMBODIMENTS

One embodiment of a control device of the present invention is described below with reference to FIGS. 1 through 13. A control device of the present embodiment controls an image forming apparatus, such as a multifunction printer and a printer, and is provided to the image forming apparatus. In the present embodiment, the control device targets a multifunction printer. The following explains the control device provided to the multifunction printer.

(Network System)

Figure 2:
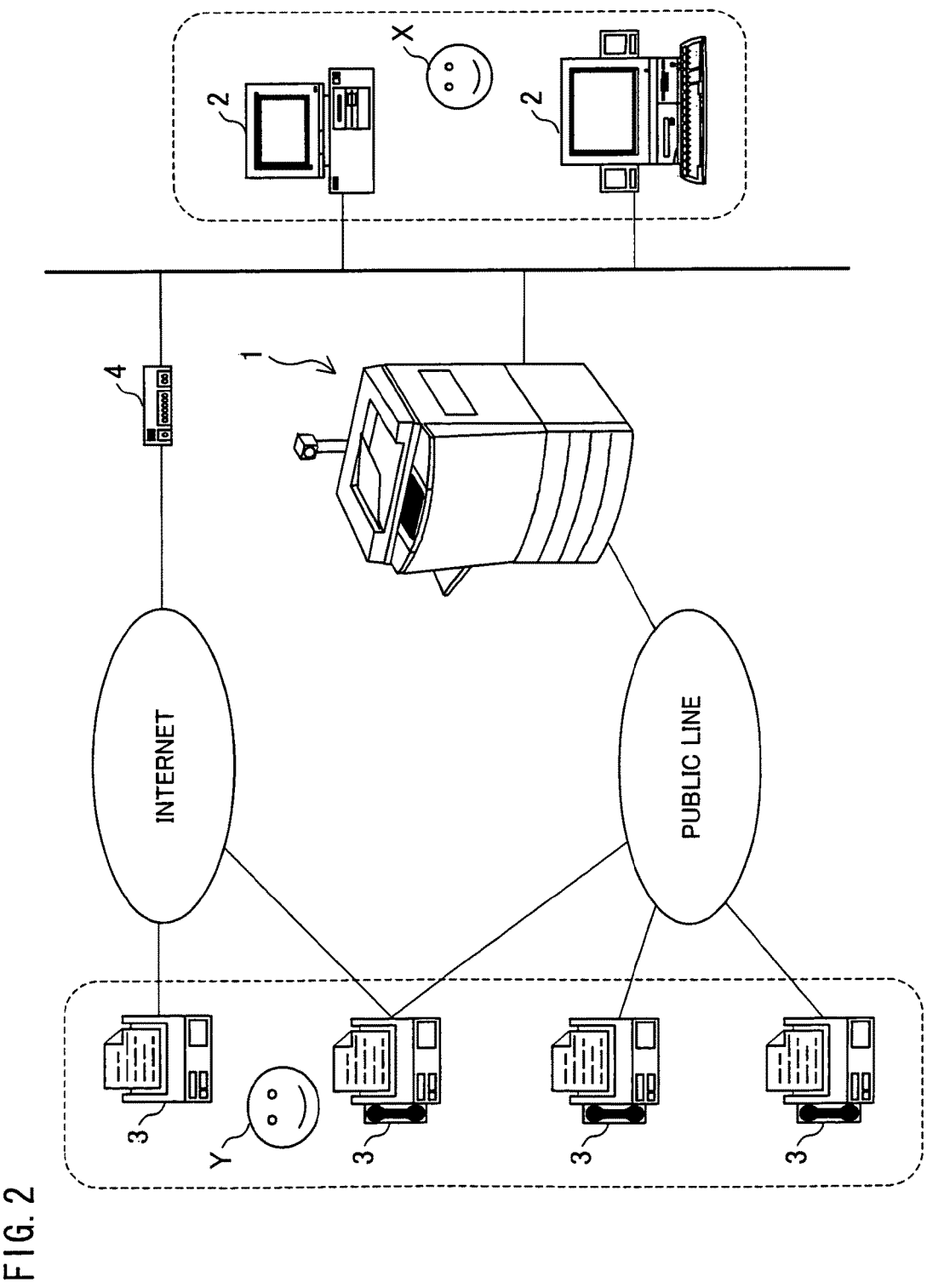
FIG. 2 illustrates a network system including a multifunction printer having the control device in accordance with the embodiment of the present invention.

FIG. 2 schematically illustrates a network system including a multifunction printer 1 which includes the control device of the present embodiment. The multifunction printer 1 is connected with a dedicated terminal (terminal) 2, such as an information processing device, via an LAN (Local Area Network), as illustrated in FIG. 2. The dedicated terminal 2 is located relatively close to the multifunction printer 1, that is, on the same floor or in the same facility, for example. Further, the multifunction printer 1 is connected with an external terminal (terminal) 3, such as an information processing device or a facsimile machine, via a communication network, such as a public line and the Internet network.

Examples of a way to use the multifunction printer 1 in such a network system are described below.

First, the following deals with a case where the dedicated terminal 2 sends image data (print data) of a target image to the multifunction printer 1. In this case, a user X creates the print data on the dedicated terminal 2, and presses a run button to start print processing. When the run button for starting the print processing is pressed, the dedicated terminal 2 sends the print data created on the dedicated terminal 2 to the multifunction printer 1. Then, the user X goes to the multifunction printer 1 to get a printed matter on which the image is printed based on the print data that has been sent to the multifunction printer 1.

Another usage is in a case where the external terminal 3 sends print data to the multifunction printer 1. In this case, a user Y creates the print data on the external terminal 3, and presses the run button to start the print processing. When the run button for starting the print processing is pressed, the external terminal 3 sends the print data to the multifunction printer 1 via a router 4 by use of a communication network, such as public lines and the Internet. Simultaneously, the user Y gives the user X, who is in the vicinity of the multifunction printer 1, notice by e-mail, FAX, telephone, or the like, that the user Y has issued the print instruction to the multifunction printer 1. The user X receives the notice, and goes to the multifunction printer 1 to get the printed matter on which the image is formed based on the print data that has been sent from the external device. With this usage, it is also possible for the user Y to come to the multifunction printer 1 to get the printed matter by himself. In this case, however, the user Y gets the printed matter a long time after the sending of the print data.

With either usage, the user X or Y sends the print data to the multifunction printer 1 by operating a terminal which is connected with the multifunction printer 1 via a network, and goes to the multifunction printer 1 to get the printed matter. There are cases where the printed matter is a confidential document that only a specified person (people) is (are) allowed to view. If the multifunction printer 1 starts printing the image immediately after the print instruction is inputted on each terminal, there will be a risk that another person views the confidential document. For this reason, the control device of the present embodiment, provided to the multifunction printer 1, has functions of: capturing a face image of the user X or Y who comes in front of the multifunction printer 1; performing authentication of the user with use of the face image; and if authentication is successful, starting the printing.

In order to attain such functions, the external terminal 3 and the dedicated terminal 2 add print job-related information to the print data in sending the print data to the multifunction printer 1. The print job-related information is used to identify the user who has issued the print instruction based on the print data (or another user who goes to get the printed matter).

FIG. 3 shows an example of the print job-related information. As shown in FIG. 3, the print job-related information includes: terminal information indicating where the terminal (a print data source) belongs to; user identification information (herein, a user name) for identifying the user who issues an instruction to send the data; an authentication password;

document information for specifying the print data; and a setting flag (described later in detail) indicating timing of a print output.

Here, the terminal information indicates a limit of an operation authority that is bestowed to a user of each terminal in order to use the multifunction printer 1. In the present embodiment, categories, such as "GENERAL USER" and "ADMINISTRATOR", are stored as the terminal information. Each category differs in availability of functions of the multifunction printer 1. For example, there may be such an arrangement that a user belonging to "ADMINISTRATOR" can use all the functions, and another user belonging to "GENERAL USER" can use the functions except a function of sending a FAX.

Under a condition where a single terminal is provided to each user, the user identification information may be information (owner's name) of an owner of a terminal.

The document information includes: a data name (document name) of print data; a name of an application (the application that has been used to create the print data); color/black-and-white mode information of the print data; image quality of the print data; attribute information indicating a destination of the printed matter; user authentication processing necessary/unnecessary information; and/or the like.

Each terminal creates the print job-related information based on information inputted from the user, when sending the print data to the multifunction printer.

Each terminal may store the print job-related information as defaults in advance, and edit the print job-related information (defaults) based on the information inputted from the user, when sending the print data to the multifunction printer. For example, each terminal may store the print job-related information in such a manner that a name of the user owning the terminal is set as the default. The user does not have to change the default user name, in a case where the user operates his terminal to send the print data, and goes to get the printed matter by himself. Meanwhile, in a case where the user operates the terminal to send the print data, and make another user go to get the printed matter, the user only has to change the user's name into the another user's name.

Each terminal may create a part of the document information (the application name, the color/black-and-white mode information, or the like) by analyzing the print data.

(Arrangement of Multifunction Printer)

Figure 4:
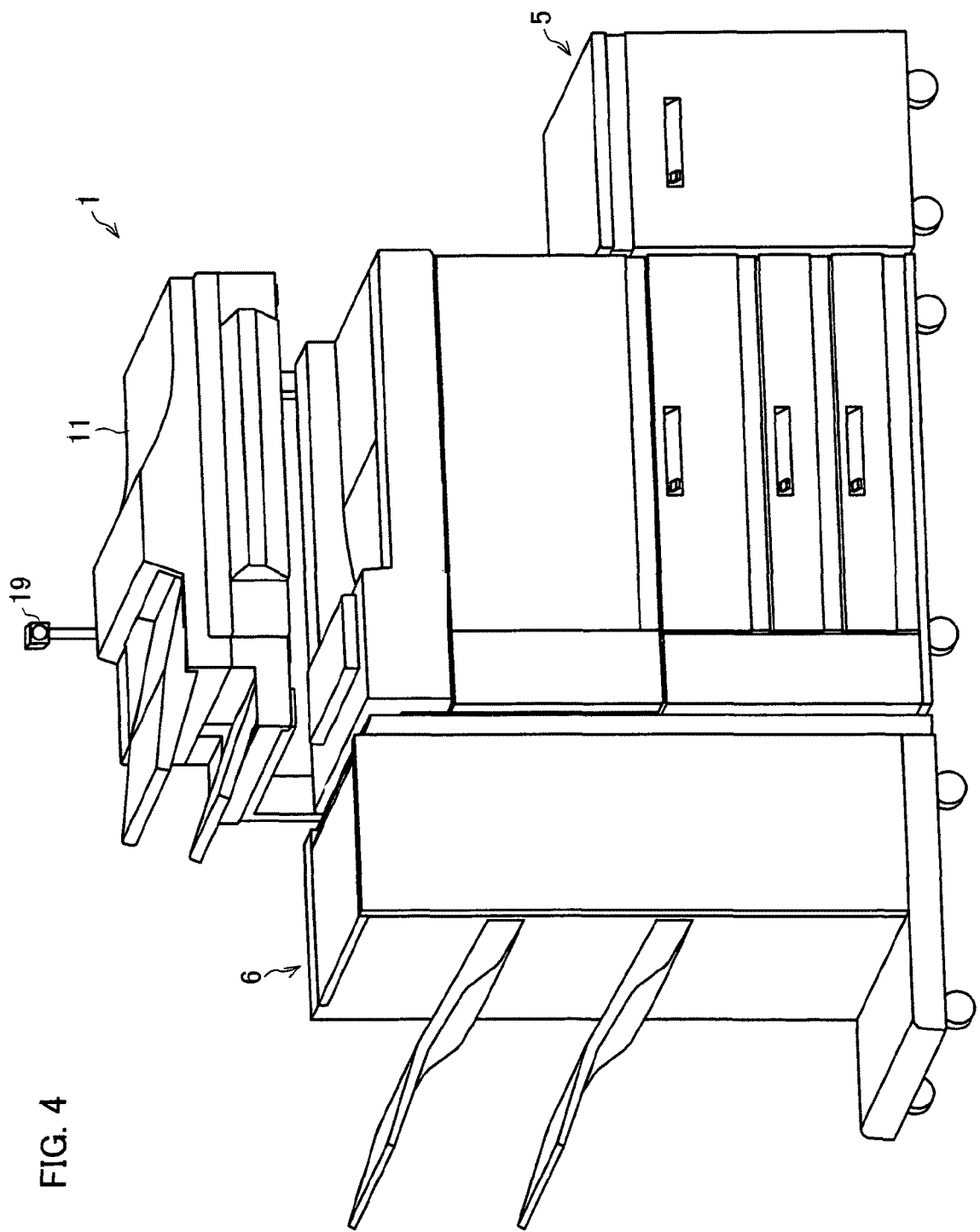
FIG. 4 is a perspective view illustrating an outline of the multifunction printer in accordance with the embodiment of the present invention.
Figure 5:
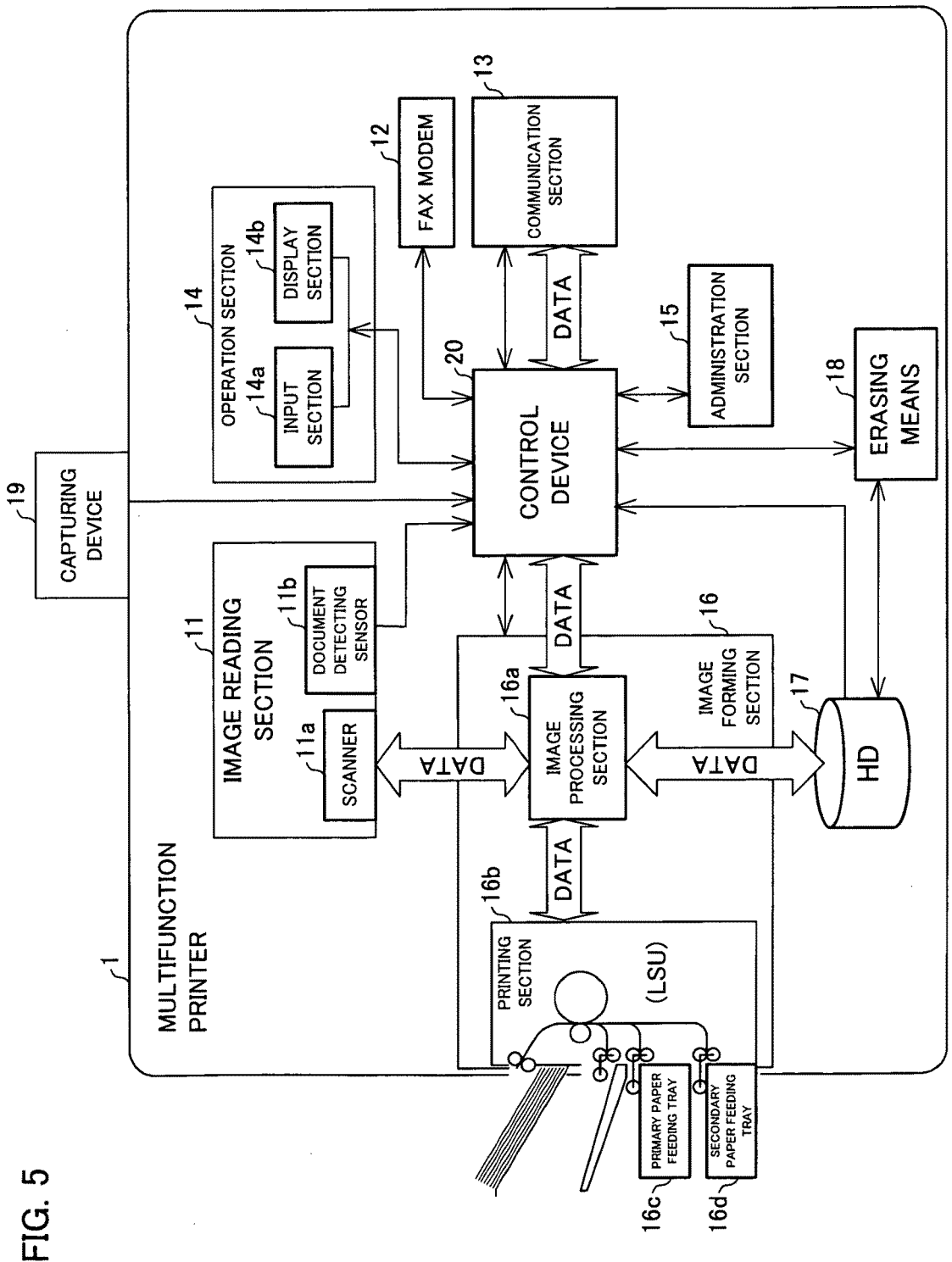
FIG. 5 is a block diagram illustrating an arrangement of the multifunction printer in accordance with the embodiment of the present invention.

Next, the following schematically explains the multifunction printer 1 to which an image processing apparatus of the present embodiment is applied. FIG. 4 is a perspective view illustrating an outline of the multifunction printer 1. FIG. 5 is a block diagram illustrating an arrangement of the multifunction printer 1 in detail. The multifunction printer 1 may be provided with option devices, such as a paper ejecting device 6 for performing sorter processing, and a high-capacity paper feeding device 5, as illustrated in FIG. 4.

As illustrated in FIG. 5, the multifunction printer 1 includes: an image reading section 11; a FAX modem (receiving means) 12, a communication section (receiving means) 13, an operation section 14, an administration section 15, an image forming section (image forming means) 16, a hard disk 17, an erasing section 18, and a control device 20. Further, the multifunction printer 1 is provided with an image capturing device 19.

The image reading section 11 reads a document image put on a scanner platen, and outputs image data of the image. The image reading section 11 includes a scanner 11a including a device (such as a CCD) for converting optical information into an electrical signal. The scanner 11a outputs a reflected optical image of the document as analogue signals R, G, and B. Further, the image reading section 11 includes a document detecting sensor 11b for detecting presence and a size of the document.

The FAX modem 12 receives, via a telephone line, the print data that will be printed, and outputs the print data to the control device 20. Further, the FAX modem 12 outputs an output signal to an external facsimile machine via a telephone line network. The output signal is created such that the image data read by the image reading section 11 is converted into an appropriate form.

The communication section 13 receives the print data via a network, such as the LAN, and outputs the print data to the control device 20. Further, the image data read by the image reading section 11 is converted into an output signal of an appropriate form. The communication section 13 outputs the output signal to a terminal via each network The communication section 13 can send the image data to a terminal by e-mail.

The operation section 14 includes: an input section (input device) 14a for accepting desired operation or image quality adjustments from a user; and a display section (display device) 14b constituted by a liquid crystal display device for exhibiting conditions of operation or setting values, and various data to the user; and the like. Further, the operation section 14 is constituted by a touch screen, a keyboard, or the like. By the operation section 14, information inputted at the input section 14a is outputted to the control device 20. Further, the display section 14b displays various screens based on display data received from the control device 20.

The administration section 15 is constituted by a nonvolatile memory device, such as a flash memory. The administration section 15 administrates: various setting values that represents processing conditions of each section; and a user reference table that is necessary for the user authentication processing. The user reference table will be described later in detail.

The image forming section 16 forms an image on recording paper based on the inputted image data or print data, and ejects the recording paper. The image forming section 16 includes an image processing section 16a and a printing section 16b.

The image processing section 16a performs the image processing with respect to the image data read by the image reading section 11. The image processing may be an A/D conversion processing, a shading compensation processing, an input gradation compensation processing, a segmentation processing, a color compensation processing, an under color removal and black generation processing, a spatial filter processing, a gradation reproduction processing, or the like. Further, the image processing section 16a converts the print data received by the FAX modem 12 or the communication section 13 into each data of C, M, Y, and K. The image processing section 16a also converts the image data into a form (such as the FAX data and e-mail) suitable for the sending via each network. The image processing section 16a stores the target image data or print data in the hard disk 17. After performing the image processing of the stored data, the image processing section 16a outputs the processed data to the printing section 16b or the control device 20 one after the other.

The printing section 16b forms an image on the recording paper by use of each toner of C, M, Y, and K. The image is based on the image data or print data processed by the image processing section 16a. The printing section 16b receives the recording paper from the high-capacity paper feeding device 5, or built-in paper feeding trays 16c and 16d. The printing section 16b ejects the recording paper after forming images on the recording paper. The printing section 16b includes a photosensitive drum, an electrification device, an exposure device, a developing device, a fixing device, and the like.

The erasing section 18 erases, from the hard disk 17, data that has been print-processed (image forming-processed) or sent.

The image capturing device 19 is, for example, a CCD (Charge Coupled Device) or CMOS (Completely Metal Oxide Semiconductor) camera. The image capturing device 19 captures images of the vicinity of the multifunction printer 1 continuously, and outputs the captured data to the control device 20. Therefore, the image capturing device 19 captures an image of a user when the user comes in the vicinity of the multifunction printer 1. The image captured by the image capturing device 19 is used to authenticate the user with use of face images, as described later. For this reason, in order to authenticate a user successfully, the image capturing device 19 is preferably set at a height around a face of a person (user) of average body height, as illustrated in FIG. 4.

The control device 20 includes a multi-purpose CPU, a multipurpose memory, and the like, and controls each of the sections described above.

Specifically, the control device 20 controls the image reading section 11, the image forming section 16, the FAX modem 12, the communication section 13, and the like, in accordance with instructions inputted into the input section 14a. For example, when a copy instruction is inputted, the control device 20 operates the image reading section 11 to read a document, and controls the image forming section 16 to form an image in accordance with the image data read by the image reading section 11. In this operation, the control device 20 changes various setting values administrated by the administration section 15, depending on setting conditions inputted into the input section 14a. Further, the control device 20 determines the size of the recording paper based on results found by the document detecting sensor 11b. Furthermore, the control device 20 instructs the erasing section 18 to erase the data that has been already print-processed, when receiving a notice of completion of the print processing from the image forming section 16, or receiving a notice of completion of the image sending processing from the FAX modem 12 or the communication section 13.

Moreover, when an instruction to send a FAX is inputted, the control device 20 operates (i) the image reading section 11 to read the document, (ii) the image processing section 16a to convert the read image data into a form suitable for sending the data as a FAX, and (iii) the FAX modem 12 to send the image data that has been converted into the appropriate form.

Such processing of the control device 20 is the same as of a conventional multifunction printer, so that detailed explanations regarding the processing is omitted here.

The control device 20 of the present embodiment performs user authentication processing based on user's face image captured by the image capturing device 19. Depending on a result of the authentication, the control device 20 controls print processing for the print data that has been received from the terminal. The following explains an arrangement for performing the user authentication processing and the print processing.

(User Reference Table Administrated by Administration Section)

First, the following explains the user reference table that the administration section 15 administrates in order to perform the user authentication processing. The user reference table is stored in the multifunction printer 1 in advance. FIG. 6 shows an example of the user reference table.

As shown in FIG. 6, the user reference table is a table in which the followings are associated with each other: a user ID which is granted to each user; a user name (user identification information) of the user; a authentication password which is granted to the user; authority information indicating the user's availability of the functions; information indicating whether or not there is a reference of a personal operation screen for the user (personal operation screen presence/absence information); personal operation screen data indicating the personal operation screen; destination reference information indicating FAX numbers and e-mail addresses which are used as destinations; and face authentication reference image numbers for identifying a reference face image of the user.

Here, the destination reference information is the FAX numbers and e-mail addresses that are stored as the destinations to which the user frequently sends images, or the like. The destination reference information is associated with destination information indicating the destination (herein, a user name of a destination).

Further, the authority information represents availability of the functions. In the present embodiment, categories, such as "GENERAL USER", "ADMINISTRATOR", and the like, are stored as the authority information. For example, there may be such an arrangement that a user belonging to "ADMINISTRATOR" can use all the functions, and another user belonging to "GENERAL USER" can use the functions except a function of sending a FAX.

The administration section 15 administrates authority-associated operation screen data according to the authority information. The authority-associated operation screen data is data of an operation screen through which the user can use only functions permitted by the authority information.

Further, the personal operation screen is an operation screen produced in such a manner that the operation screen based on the authority-associated operation screen data is customized for easy operation for each user.

Furthermore, as an accessory table of the user reference table, the administration section 15 stores a reference face image table in which a face authentication reference image number, and a user's reference face image that is stored in advance are associated with each other. That is, the user reference table added with the reference face image table is associated information (primary associated information) in which the reference face image of each user is associated with the user name of each user.

(Arrangement of Control Device)

Next, the following explains an arrangement of the control device 20. The arrangement is related to the user authentication processing and print processing.

Figure 1:
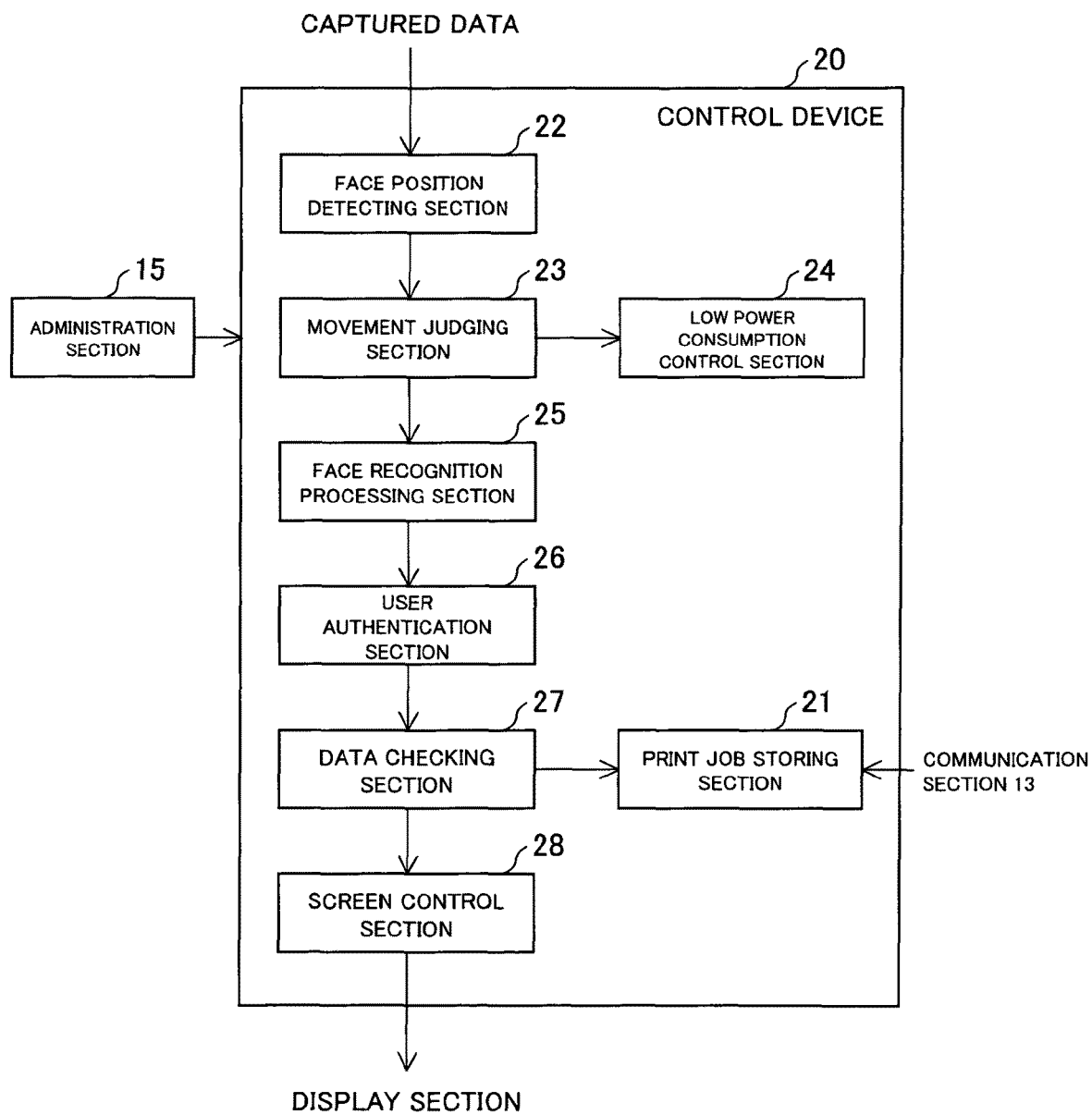
FIG. 1 is a block diagram illustrating an arrangement of a control device in accordance with an embodiment of the present invention.

FIG. 1 is a block diagram illustrating the arrangement of the control device 20. FIG. 1 illustrates only blocks related to the user authentication processing and print processing. The control device 20 includes a print job storing section 21, a face position detecting section 22, a movement judging section 23, a low power consumption control section 24, a face recognition processing section 25, a user authentication section (user specifying section, display control section) 26, a data checking section 27, and a screen control section (display control section) 28, as illustrated in FIG. 1.

The print job storing section 21 temporarily stores the print job-related information (see FIG. 3), which has been added to the print data. The print data is received by the communication section 13 from each terminal. The print data added with the print job-related information is stored in the hard disk 17.

The face position detecting section 22 detects a position of a face of the user being present in the vicinity of the multifunction printer 1. The face position detecting section 22 detects the position of the face of the user by analyzing the captured image data supplied from the capturing device 19.

The face position detecting section 22 judges whether or not there is a partial image assumed to be a human face in a moving image (continuing still images) of the captured data. If the face position detecting section 22 judges that there is such a partial image, the face position detecting section 22 finds feature values indicating the position of the partial image (hereinafter, referred to as a face position), and a size of the partial image. For example, the face position detecting section 22 finds coordinates of start and end points of a rectangular region (hereinafter, referred to as circumscribing rectangular region) which circumscribes an outline of the face. FIG. 7 illustrates the circumscribing rectangular region (shown with dashed lines in FIG. 7), the start point Ps (Xs, Ys) thereof, and the end point Pe (Xe, Ye) thereof.

A way of judging whether or not there is a partial image assumed to be a human face, may be, for example, a method of: extracting a region that is similar in color to human skin; and then, judging whether or not the region contains characteristic shapes, such as eyes, eyebrows, and a mouth, or judging whether or not a value equal to or higher than a predetermined threshold value is found in such a region. In a case where there is a plurality of people in the captured image, a face position of a person in a frame may be associated with the face position of the person in another frame before or after the above frame. For example, a face in an original frame and a face in the vicinity of the original face position in another frame can be associated as the same person, because depending on a frame rate and a field angle though, single to double figure frames are inputted per one second for a general moving image. Such techniques have been widely adopted in a digital camera and the like in recent years, and can be applied to the present invention, as well.

The movement judging section 23 judges whether or not a person in a captured image is coming toward the multifunction printer 1, by use of results of the feature values indicating the face position and face size detected by the face position detecting section 22.

For example, in a case where the feature values showing the face position and size are the start and end points of a circumscribing rectangular region, as described above, the movement judging section 23 can judge in the following manner. The movement judging section 23 finds a center point C (an intermediate value between the coordinates of the start and end points) and an area S (a product of difference values of the coordinates of the start and end points) of the circumscribing rectangular region (detected by the face position detecting section 22) in each of a plurality of continuing still images. As illustrated in FIG. 8, the capturing device 19 is arranged to capture a region in such a manner that a center of a face position of a person (user who operates the multifunction printer 1) of average build corresponds to a center of a screen of the capturing device 19. The movement judging section 23 judges that the user who is captured in the face position approaches the multifunction printer 1, if the center position C moves toward the center of the screen, and simultaneously, the area S becomes larger. Note that the judging method of the movement judging section 23 is not limited to this.

If the movement judging section 23 judges that the user who is captured in the face position approaches the multifunction printer 1, the movement judging section 23 outputs a return instruction to the low power consumption control section 24, and an instruction to the face recognition processing section 25 to start a recognition processing.

The low power consumption control section 24 controls supply of electricity to each of the sections of the multifunction printer 1. The low power consumption control section 24 has two sorts of electricity supply mode, that is, a normal mode and a low power consumption mode. The low power consumption control section 24 stops the supply of the electricity to the image forming section 16 and the display section 14b in the low power consumption mode. In other words, the low power consumption control section 24 stops the supply of the electricity to a heat lamp of the fixing device. Meanwhile, the low power consumption control section 24 supplies all the blocks with the electricity in the normal mode. In a case where the low power consumption control section 24 does not receive any operation instructions from a user for a certain period, the low power consumption control section 24 shifts the electricity supply mode from the normal mode into the low power consumption mode. Further, when receiving a return instruction from the movement judging section 23, the low power consumption control section 24 shifted the electricity mode from the low power consumption mode into the normal mode.

The face recognition processing section 25 (i) checks an image having the position, which is detected by the face position detecting section 22 in the data captured by the capturing device 19, against the reference face images, which have been stored in advance in the reference face image table that is administrated by the administration section 15, and (ii) extracts a reference face image that matches the partial image. Here, "matches" does not mean only a case where these images perfectly match, but includes a case where these images are similar to each other. That is, among the reference face images, the extracted reference face image is closest to the partial image in feature value, and simultaneously, a concordance rate of the feature values of the reference face image and the detected face image is equal to or more than a predetermined threshold value.

As a general face recognition method employing an actual CCD camera (capturing sensor), various pattern recognition methods using a two dimensional elevation view have been proposed. These methods are organized in "Computer Recognition of Human Face—A Survey—(The Institute of Electronics, Information and Communication Engineers, A vol. J80-A, No. 8, pp. 1215-1230, August 1997, Shigeru Akamatsu)". With such techniques, the face recognition processing section 25 extracts feature values from a face pattern of a face image having the position detected by the face position detecting section 22, and provides the feature values as a feature vector. Further, the face recognition processing section 25 finds a difference between the feature vector, and a feature vector of each of the reference face images, and judges that a reference face image satisfying the following two conditions matches the face image having the position detected by the face position detecting section 22: (i) a reference face image has the smallest difference in feature vector among all of the reference face images; (ii) the difference of the reference face image is equal to or less than a predetermined threshold value.

The proposed techniques mostly differ in way of extracting the feature values from the face pattern. The document cited above contains several examples. The following deals with two examples described in the document.

Description as to Method Based on Geometrical Facial Features (Facial Feature-Based Method)

In this method, a line image (edge element) is formed from a face image by use of a differential filter. The line image is locally projected in horizontal and perpendicular directions, and threshold-processed. Thereby, positions of facial constituents (eyes, a nose, a mouth, and the like), an outline shape of a jaw, and the like, are digitalized. The obtained values are provided as the feature vector.

Checking Comprehensive Contrast Patterns (Pattern Matching Method)

In this method, a gradation of each pixel (pixels having tones) is provided as the feature vector, without any modifications. With the method, however, it takes a long time to carry out calculation due to a huge order, and also, the reference data that should be authenticated has a large volume. Therefore, in the method, the order of the feature vector is reduced by modifying an image into blocks. Further, a change in lightning environment or the like, easily have an influence on accuracy of the gradations. Therefore, the method has adopted modifications, such as normalization for absorbing differences in density, and quantization of rough gradations. The latter modification can be used to reduce the calculation described above, as well.

With such techniques, the face recognition processing section 25 judges whether or not the reference face image that matches the face image captured by the capturing device 19 is stored in the reference face image table administrated by the administration section 15. Then, the face recognition processing section 25 reads a face authentication reference image number out of the reference face image table. The face authentication reference image number corresponds to the reference face image that matches the face image captured by the capturing device 19. Then, the face recognition section 25 outputs the number to the user authentication section 26.

The user authentication section 26 receives the face authentication reference image number from the face recognition section 25, and authenticates the user who comes in front of the multifunction printer 1 based on the number. Simultaneously, the user authentication section 26 determines display operation screen data, which is data of a target operation screen.

The user authentication section 26 reads a user name associated with the face authentication reference image number out of the user reference table administrated by the administration section 15. The user authentication section 26 judges that the user who is specified with the user name comes in front of the multifunction printer 1. Then, the user authentication section 26 outputs the user name to the data checking section 27.

Further, the user authentication section 26 reads out personal operation screen presence/absence information associated with the user name. If the personal operation screen presence/absence information indicates "presence", the user authentication section 26 determines personal operation screen data associated with the user name as the display operation screen data. On the other hand, if the personal operation screen presence/absence information indicates "absence", the user authentication section 26 checks the authority information associated with the user name in the user reference table. Then, the user authentication section 26 reads the authority-associated operation screen data corresponding to the authority information out of the administration section 15, and determines the data as the display operation screen data.

The data checking section 27 checks whether or not there is the print data sent from a terminal owned by the user. The user has been authorized by the user authentication section 26. Specifically, among the print job-related information administrated by the print job storing section 21, the data checking section 27 searches for data containing the user name outputted from the user authentication section 26.

In a case where the print job-related information including the user name outputted from the user authentication section 26 is stored, the data checking section 27 checks the setting flag in the print job-related information. In a case where the setting flag is "off", the data checking section 27 instructs the image forming section 16 to start the print processing based on the print data added with the print job-related information including the setting flag. Further, the data checking section 27 erases the print job-related information including the setting flag from the print job storing section 21.

On the other hand, in a case where the setting flag is "on", the data checking section 27 reads a document name and a user ID out of the print job-related information including the setting flag, and then makes a list as illustrated in FIG. 9. When making the list, the data checking section 27 can add various information included in the document information to the list. Then, the data checking section 27 outputs the list to the screen control section 28, and operates the display section 14b to display the list and an output instruction input screen. According to an instruction inputted into the input section 14a, the data checking section 27 instructs the image forming section 16 to start the print processing of the print data added with the print job-related information including a document name(s) selected by the user. Further, the data checking section 27 erases the print job-related information including the setting flag from the print job storing section 21.

In a case where the print job-related information including the user name outputted from the user authentication section 26 is not stored in the print job storing section 21, the data checking section 27 outputs an instruction to display an operation screen to the screen control section 28.

The screen control section 28 controls the operation screen displayed on the display section 14b. When receiving the instruction to display an operation screen from the data checking section 27, the screen control section 28 demands the display operation screen data from the user authentication section 26. Then, the screen control section 28 obtains the display operation screen data determined by the user authentication section 26. The screen control section 28 operates the display section 14b to display an operation screen indicated by the display operation screen data. Further, when receiving the list of the print data from the data checking section 27, the screen control section 28 operates the display section 14b to display the list and the output instruction input screen with which the user can select data to be printed.

(Flow of Processing in Control Device)

Figure 10:
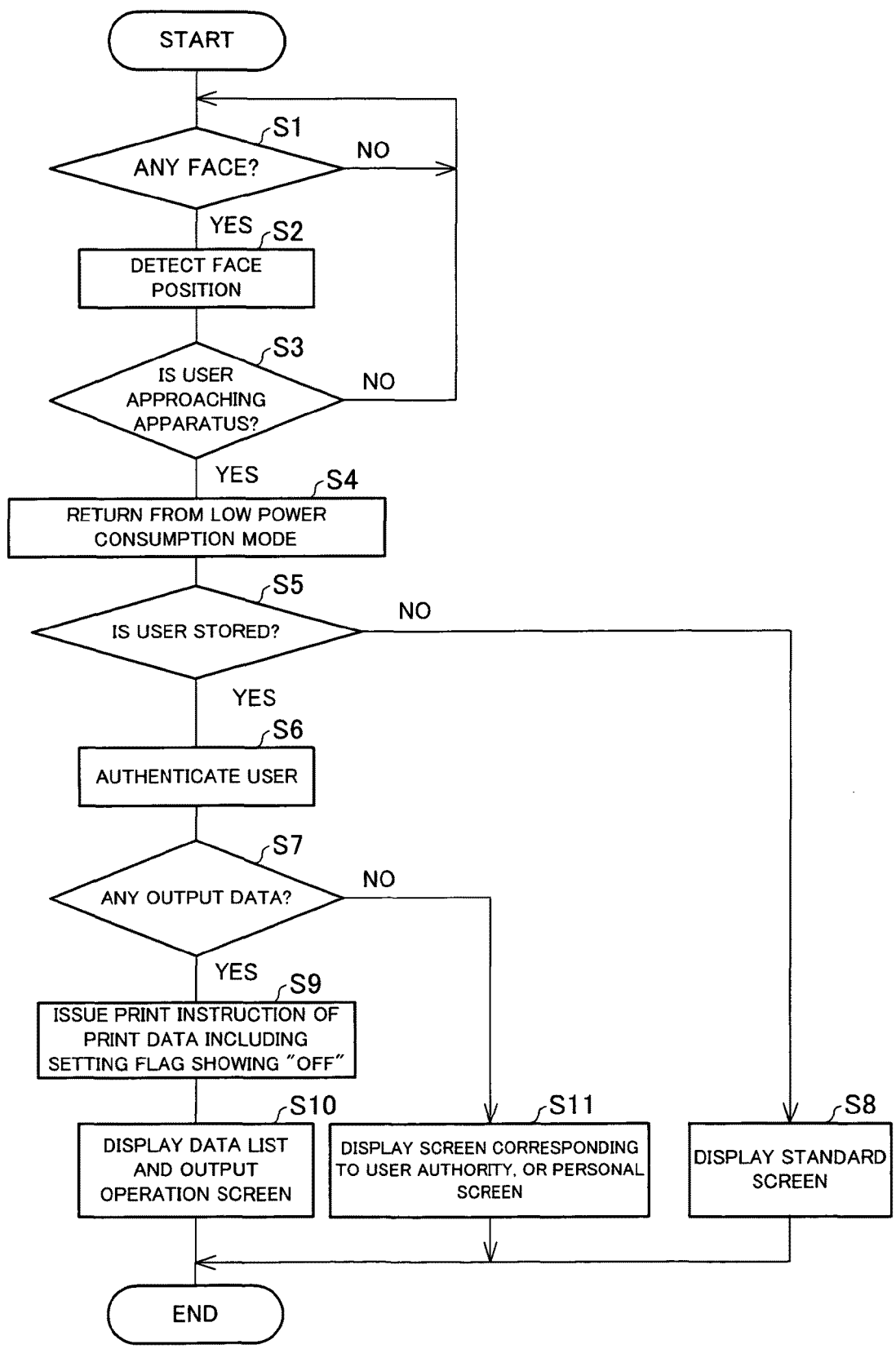
FIG. 10 is a flow chart showing a flow of processing of the control device.

Next, the following explains a flow of processing in the control device 20 with reference to a flow chart shown in FIG. 10.

First, the face position detecting section 22 analyzes the captured data sent from the capturing device 19, and checks whether there is a partial image assumed to be a human face, or not (S1).

If there is such a partial image (S1: Yes), the face position detecting section 22 finds feature values indicating the position (face position) and size of the partial image (S2). Specifically, the feature values are the coordinates of the start and end points of the rectangular region that circumscribes the outline of the face, for example.

Next, the movement judging section 23 judges whether or not the captured person approaches the multifunction printer 1 (S3), based on temporal changes in the specific values found by the face position detecting section 22. The examples of the judging method are specifically described above, so that the explanations here are omitted.

In a case where the movement judging section 23 judges that the person approaches the multifunction printer 1 (S3: Yes), the low power consumption control section 24 returns the multifunction printer 1 from the low power consumption mode back into the normal mode (S4). Specifically, the low power consumption control section 24 turns on a heater lamp of the fixing device, and the display section 14*b*. In a case where the multifunction printer 1 is already in the normal mode, the processing of S4 is skipped.

Next, the face recognition processing section 25 checks the partial image at the face position detected by the face position detecting section 22, against the reference face images stored in the administration section 15, and checks whether or not there is a reference face image that matches the partial image (S5). The checking method is specifically described above, so that the explanations here are omitted.

In a case where there is no reference face image that matches the partial image (S5: No), the face recognition processing section 25 gives the screen control section 28 the notice of the result. And then, the screen control section 28 operates the display section 14*b* to display a standard operation screen for a user whose reference face image is not stored (S8). Examples of such an operation screen encompass: an operation screen on which only basic functions (such as a copy machine) of the multifunction printer 1 are available; a registration screen on which a user performs user registration; and a login screen on which a user input a user ID and a password via key input in order to perform the user authentication.

In a case where there is the reference face image that matches the partial image (S5: Yes), the face recognition processing section 25 reads the face authentication reference image number associated with the reference face image out of the reference face image table of the administration section 15, and then, outputs the number to the user authentication section 26. Then, the user authentication section 26 reads the user name associated with the face authentication reference image number out of the user reference table, and authenticates the user who is identified by the user name (S6). Then, the user authentication section 26 outputs the user name to the data checking section 27, and simultaneously determines the display operation screen data based on the personal operation screen presence/absence information, and the personal operation screen data, as described above.

Next, the data checking section 27 checks whether or not the print job storing section 21 administrates the print job-related information including the user name received from the user authentication section 26 (S7).

In a case where the print job storing section 21 administrates the print job-related information including the user name authenticated by the user authentication section 26 (S7: Yes), the data checking section 27 checks the setting flag in the print job-related information. Then, the data checking section 27 instructs the image forming section 16 to start the print processing based on the print data added with the print job-related information including the setting flag indicating "off" (S9). Further, the data checking section 27 erases the print job-related information including the setting flag from the print job storing section 21. In a case where there is no print job-related information including the setting flag indicating "off", the processing of S9 is skipped.

After that, the data checking section 27 reads the document name and the user ID out of the print job-related information including the setting flag indicating "on", and creates the list as illustrated in FIG. 9. The screen control section 28 instructs the display section 14*b* to display the list and the output operation screen (S10). On an instruction inputted into the input section 14*a*, the data checking section 27 instructs the image forming section 16 to start the print processing of the print data added with the print job-related information including the selected document name. Further, the data checking section 27 erases the print job-related information including the setting flag from the print job storing section 21. The user can cancel the print instruction of the unnecessary print data when finding unnecessary print data displayed in the list. In a case where the cancel instruction is inputted, the data checking section 27 erases the print job-related information of the canceled print data from the print job storing section 21. Further, the data checking section 27 instructs the erasing section 18 to erase the canceled print data. As a result, the print data is erased from the hard disk 17. In a case where there is no print job-related information including the setting flag indicating "on", the processing of S10 is skipped.

Meanwhile, in a case where the print job storing section 21 does not administrate the print job-related information including the user name outputted from the user authentication section 26 (S7: No.), the data checking section 27 outputs, to the screen control section 28, an instruction to display an operation screen. Then, the screen control section 28 demands the display operation screen data from the user authentication section 26, and obtains the display operation screen data that is determined by the user authentication section 26. After that, the screen control section 28 instructs the display section 14*b* to display the operation screen indicated by the display operation screen data thus obtained.

Here, in the print job-related information, if the personal operation screen presence/absence information indicates "presence", the display operation screen data is the personal operation screen data that is administrated in connection with the user name. On the other hand, if the personal operation screen presence/absence information indicates "absence", the display operation screen data is the authority-associated operation screen data corresponding to the authority information administrated in connection with the user name.

Figure 11:
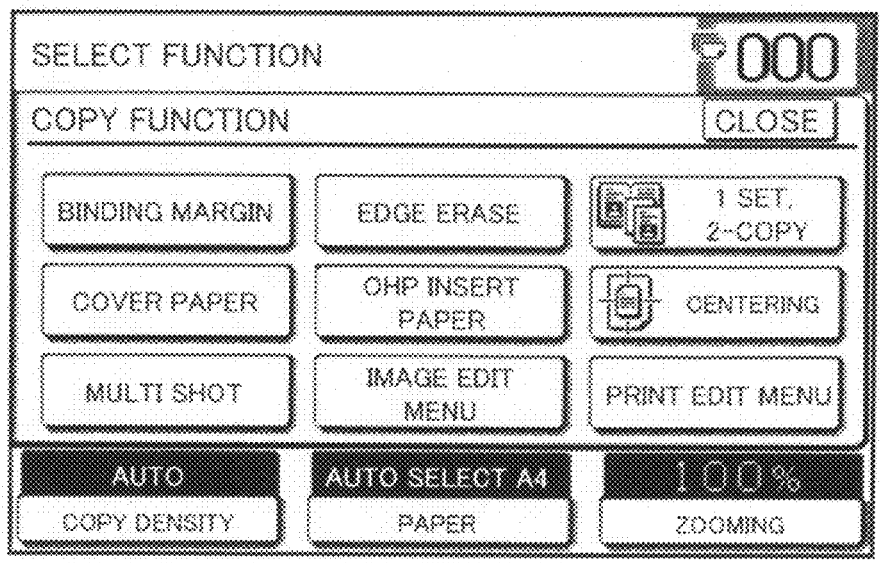
FIG. 11 illustrates an example of a personal operation screen.

FIG. 11 illustrates an example of the personal operation screen. In the personal operation screen, functions are displayed in such a manner that functions frequently used by the user are given priority over the other functions.

Figure 12:
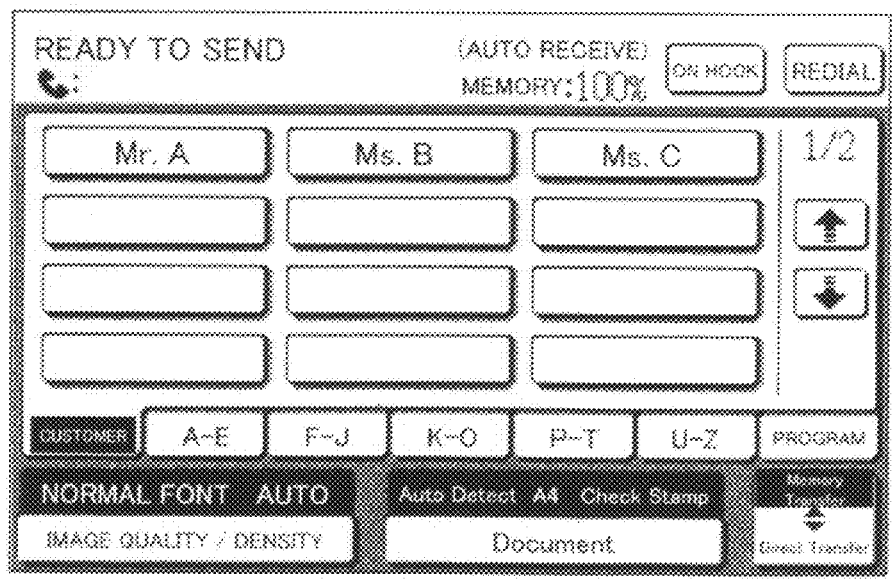
FIG. 12 illustrates an example of a screen when a user selects an operation button to send a FAX.

Further, FIG. 12 illustrates an example of the screen when the user selects an operation button to send a FAX on the operation screen displayed in S11. The screen control section 28 reads the destination reference information out of the user reference table. The destination reference information corresponds to the user name authenticated in S6. And then, the destination information indicated by the destination reference information is displayed on the screen, as illustrated in FIG. 12. This allows the user not to input a FAX number when the user sends a FAX to a destination that the user stored in advance.

(Modification 1)

In the explanations above, the control device 20 targets the multifunction printer 1. However, as described above, the control device of the present invention is not limited to the multifunction printer 1, and may target an image output device, such as a printer.

Figure 13:
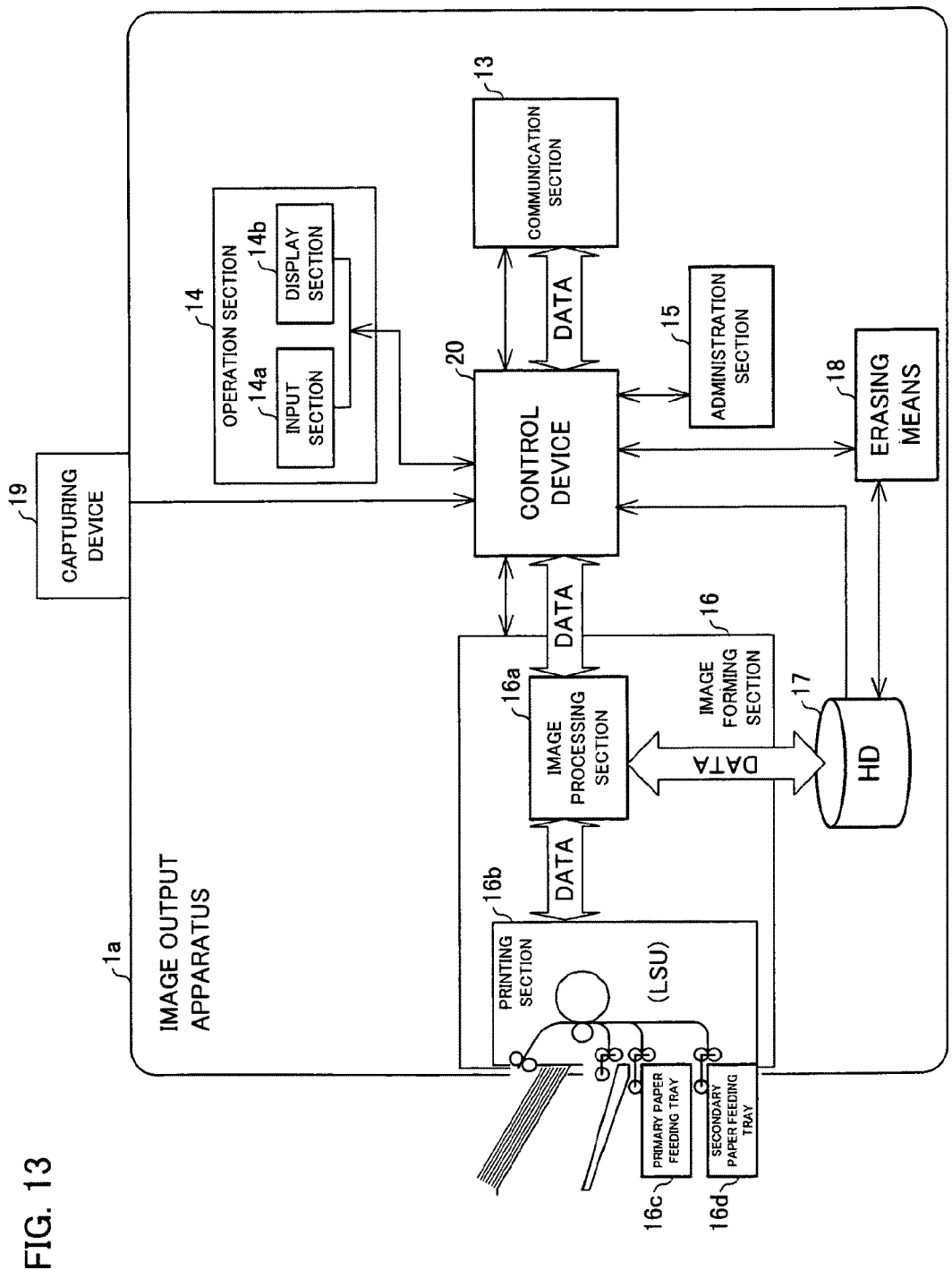
FIG. 13 illustrates another example of an image forming apparatus having the control device in accordance with the embodiment of the present invention.

FIG. 13 illustrates an image output device 1*a* provided with the control device 20. With such an image output device (image forming apparatus) 1*a*, it also becomes possible to (i) authenticates a user in an easy way in which impersonation can be prevented without inconvenient operation, and (ii) prevents another user from accidentally viewing a printed matter.

(Modification 2)

In the explanations above, the control device 20 includes the print job storing section 21, but the print job storing section 21 may be provided outside the control device 20. Further, it is also possible to arrange the print job storing section 21 and the administration section 15 integral, as a single memory.

(Modification 3)

In the explanations above, the control device 20 includes the movement judging section 23. With the arrangement, the control device 20 starts the user authentication processing if the movement judging section 23 judges that a user approaches the multifunction printer 1. As a result, it becomes possible to start the user authentication processing before the user reaches the multifunction printer 1. Further, in a case where the setting flag is "off", it is possible to start the print processing on an earlier stage.

However, the present invention may not include the movement judging section 23. In this case, the face recognition processing section 25 may start the face recognition processing when the face position detecting section 22 detects a partial image that is assumed to be a human face, or when the size of the partial image becomes larger than a predetermined threshold value. As an alternative, the face position detecting section 22 and the face recognition processing section 25 may start their processing when a user presses any one of buttons of the operation section 14 of the multifunction printer 1. Further, the low power consumption control section 24 may change the electricity supply mode from the low power consumption mode into the normal mode at the same timing as described above.

(Modification 4)

In the explanations above, the low power consumption control section 24 changes the electricity supply mode from the low power consumption mode into the normal mode if the movement judging section 23 judges that a user approaches the multifunction printer 1. That is, the low power consumption control section 24 starts supplying the image forming section 16 with the electric power at the timing.

However, the timing of starting to supply the image forming section 16 with the electric power (that is, a timing of activating the image forming section 16) is not limited to this. For example, it is possible for the low power consumption control section 24 to activate the image forming section 16 by supplying the image forming section 16 with the electric power in a case where the data checking section 27 confirms that among the print job-related information administrated by the print job storing section 21, there is the print job-related information including the user name outputted from the user authentication section 26. In other words, the low power consumption control section functions as a start-up control section that activates the image forming section 16 in a case where the data checking section 27 confirms that the multifunction printer 1 receives the print data added with the user name specified by the user authentication section 26. In this case, the low power consumption section 24 is arranged to start supplying the display section 14b with the electric power prior to the image forming section 16 when the movement judging section 23 judges that a user approaches the multifunction printer 1.

There is a case when a user uses only a function of sending a FAX, or scanning. In such a case, the image forming section 16 is not be used. Therefore, if the low power consumption control section 24 starts supplying the image forming section 16 with the electric power at the time the movement judging section 23 judges that the user approaches the multifunction printer 1, unnecessary power consumption may be generated.

However, such unnecessary power consumption will not be generated if the low power consumption control section 24 starts supplying the image forming section 16 with the electric power consumption at the time the data checking section 27 extracts the print job-related information including the user name outputted from the user authentication section 26.

(Modification 5)

Further, in the explanations above, there are two cases depending on the sign of the setting flag, that is, a case where the printing is started on receiving a print instruction inputted into the input section 14a, and another case where the printing is started on completing the user authentication without any print instructions inputted. However, the present invention is not limited to this. It is possible to (i) make a list of all of the print data added with the print job-related information including the user name outputted from the user authentication section 26, (ii) operate the display section 14b to display the list, and (iii) start the print processing with respect to only the print data on a print instruction inputted into the input section 14a. As an alternative, it is also possible not to make any lists. In this case, it is possible to start printing all of the print data added with the print job-related information including the user name outputted from the user authentication section 26, when the user authentication is completed. In these cases, it is possible to omit the setting flag in the print job-related information.

(Modification 6)

Further, the control device 20 can be arranged so as to (i) perform the processing illustrated in FIG. 10 only in a case where the user authentication processing necessary/unnecessary information indicates "necessary" in the print job-related information, and (ii) start the print processing immediately after the communication section 13 or the FAX modem 12 receives the print data, in a case where the user authentication processing necessary/unnecessary information indicates "unnecessary".

As described above, the control device 20 of the present embodiment controls the multifunction printer (image forming apparatus) 1 which includes: the FAX modem (receiving means) 12 and communication section (receiving means) 13, both of which receive print data from a terminal (external terminal 3 or dedicated terminal 2) that is connected with the multifunction printer 1 via a network; and the image forming section (image forming means) 16 for forming an image of the print data on the recording paper.

The multifunction printer 1 is provided with the capturing device 19, and the print data is added with the user identification information for identifying the user.

The control device 20 includes: the face position detecting section 22 for detecting a position of a user's face in an image captured by the capturing device 19; the face recognition processing section 25 for (i) checking a partial image at the position, which is detected in the captured image by the face position detecting section, against reference face images, which are users' face images stored in advance; and (ii) extracting a reference face image that matches the face in the partial image; a user authentication section (user specifying section) 26 for specifying a user name corresponding to the reference face image, which is extracted by the face recognition processing section 25, by referring to a user reference table in which a reference face image is associated with a user name (user identification information) for identifying a user who has a face indicated by the reference face image; and a data checking section 27 for (i) checking whether or not the receiving means receives the print data added with the user name specified by the user specifying section, and (ii) if it is confirmed that the receiving means receives the print data, operating the image forming section 16 to form an image based on the print data.

With this arrangement, the capturing device 19 captures a user's face when the user comes in front of the multifunction printer 1. Then, the position of the user's face is detected in the captured image, and a partial image at the position is authenticated against the reference face images. The user indicated by the reference face image that matches the partial image is specified by the user name. Thus, the user who comes in front of the multifunction printer 1 is authenticated. Therefore, it becomes unnecessary for the user to input an inconvenient password or the like, and carry a card or the like.

Further, the data checking section 27 instructs the image forming section 16 to form the image based on the print data, when the print data added with the specified user name is received. Therefore, a printed matter is ejected when the user comes in the vicinity of the multifunction printer 1. This eliminates a possibility that another user accidentally gets the printed matter.

Furthermore, the control device 20 includes the movement judging section 23 which judges whether or not a user approaches the multifunction printer 1, based on temporal changes in position and size of a face of the user, the position and size detected by the face position detecting section 22. Then, the face recognition processing section 25 starts the extraction processing described above if the movement judging section 23 judges that the user approaches the multifunction printer 1.

This makes it possible to specify the user before the user reaches the multifunction printer 1. Therefore, it becomes possible to carry out the processing of the control device 20 and the image forming apparatus earlier. For example, in a case where after specifying the user, an image is formed based on the print data added with the user identification information of the user, it is possible to carry out the image forming earlier. As an alternative, in a case where after specifying the user, the display device displays a list of the print data added with the user identification information of the user, it is possible to carry out the display processing earlier.

Further, if it is confirmed that the print data added with the user name specified by the user recognition section 26 is received, the data checking section 27 instructs the display section (display device) 14b to display a screen showing the list of the print data, and instructs the image forming section 16 to form the image based on the print data on a selection instruction inputted into the input section (input device) 14a.

With this arrangement, the user can select/cancel necessary/unnecessary print data among the print data on the print instruction that the user issued.

Furthermore, the user authentication section 26 and screen control section 28 of the control device 20 determine the authority information associated with the user, who is authenticated by the user authentication section 26, by referring to the user reference table. In the user reference table, the user name is associated with the authority information that represents authority to operate the multifunction printer 1. The user who is identified by the user name has the authority. The user authentication section 26 and screen control section 28 instruct the display section 14b to display the operation screen according to the operation authority represented by the authority information.

With the arrangement, it becomes possible for the control device 20 to operate the display section 14b to display the operation screen according to the operation authority of the user, without requiring the user to input an inconvenient password or the like, or carry a card or the like.

Finally, each block of the control device 20, except the print job storing section 21, can be arranged by hardware logic, or can be realized by software with use of a CPU as described below.

That is, the control device 20 includes: the CPU (central processing unit) for carrying out an instruction from a control program that realizes each function; an ROM (read only memory) which stores the control program; an RAM (random access memory) for performing the control program; a storing device (recording medium) for storing the control program and various data; and the like. The object of the present invention can be also attained by the following way. A recording medium storing a program code (execution format program, intermediate code program, and source program) of the control program of the control device 20 in such a computer-readable manner is provided to the control device 20. The control code is software for realizing the functions described above. Then, the computer (or the CPU or the MPU) reads out and carries out the program code recorded in the recording medium.

Examples of the recording medium encompass: a tape (such as a magnetic tape, and a cassette); a disk (such as a magnetic disk (a floppy disk (trademark), and a hard disk, for example)), and an optical disk (such as a CD-ROM, an MO, an MD, a DVD, and a CD-R), a card (such as an IC card (including a memory card), and an optical card); and a semiconductor memory (such as a mask ROM, an EPROM, an EEPROM, and a flash ROM).

Further, the control device 20 can be arranged connectable to a communication network, and the program code can be provided via the communication network. The communication network is not particularly limited, and may be the Internet, an intranet, an extranet, the LAN, an ISDN, a VAN, a CATV communication network, a virtual private network, a telephone communication network, a mobile communication network, a satellite communication network, or the like. A transmission media constituting the communication network may be, but not limited to, a wired connection (such as an IEEE1394, a USB, a power-line carrier, a cable TV line, a telephone line, and an ADSL line), an infrared radiation (such as an IrDA, and a remote control), or a wireless line (such as a Bluetooth (trademark), an 802.11 radio transmission, an HDR, a mobile telephone network, a satellite line, and a digital terrestrial network). Moreover, the present invention can be realized in a form of a computer data signal embedded in a carrier wave. The computer data signal is realized by electronically transferring the program code.

The present invention is applicable to a control device which controls an image forming apparatus such as a printer, a multifunction printer, and a copy machine.

In order to attain the object, a control device of the present invention controls an image forming apparatus including (a) receiving means for receiving print data from a terminal connected with the image forming apparatus via a network, and (b) image forming means for forming an image of the print data on recording paper, the image forming apparatus being provided with a capturing device for capturing a user who is an operator, the print data being added with user identification information for identifying the user, the control device comprising: a face position detecting section for detecting a position of a user's face in an image captured by the capturing device; a face recognition processing section for (i) checking a partial image against reference face images, the partial image being at the position detected in the captured image by the face position detecting section, the reference face images being users' face images stored in advance; and (ii) extracting a reference face image that matches the face in the partial image; a user specifying section for specifying user identification information that corresponds to the reference face image extracted by the face recognition processing section, the user specifying section specifying the user identification information by referring to primary associated information in which a reference face image is associated with user identification information for identifying a user who has a face indicated by the reference face image; and a data checking section for (i) checking whether or not the receiving means receives the print data added with the user identification information specified by the user specifying section, and (ii) if it is confirmed that the receiving means receives the print data, operating the image forming means to form an image based on the print data.

Further, a method of controlling an image forming apparatus including receiving means for receiving print data from a terminal connected with the image forming apparatus via a network, and image forming means for forming an image of the print data on recording paper, the image forming apparatus being provided with a capturing device for capturing a user who is an operator, the print data being added with user identification information for identifying the user, the method comprising the steps of: (I) detecting a position of a user's face in an image captured by the capturing device; (II) checking a partial image against reference face images, the partial image being at the position detected in the captured image in the step (I), the reference face images being users' face images stored in advance; and extracting a reference face image that matches the face in the partial image; (III) specifying user identification information that corresponds to the reference face image extracted in the step (II), the user identification information specified by referring to primary associated information in which a reference face image is associated with user identification information for identifying a user who has a face indicated by the reference face image; and (IV) checking whether or not the receiving means receives the print data added with the user identification information specified in the step (III), and if it is confirmed that the receiving means receives the print data, operating a display device to display a screen showing a list of the print data, and operating the image forming means to form the image based on the print data indicated by a selection instruction inputted into an input device.

With the arrangement, the capturing device captures a user's face when the user comes in front of the multifunction printer. Then, the position of the user's face is detected in the captured image, and the partial image at the position is authenticated against the reference face images. The user indicated by the reference face image that matches the face in the partial image is specified with use of the user identification information.

Here, "matches" does not mean only a case where those perfectly match, but includes a case where those are similar to each other. That is, among the reference face images, the reference face image is closest to the partial image in feature value, and simultaneously, a concordance rate of the feature values of the reference face image and the detected face image is equal to or more than a predetermined threshold value.

The user who comes in front of the image forming apparatus is thus authenticated. Thereby, it becomes unnecessary for the user to input an inconvenient password or the like, and also to carry a card or the like.

Further, the data checking section operates the image forming means to form the image based on the print data when the receiving means receives the print data added with the specified user identification information. Therefore, the printed matter is ejected when the user comes in the vicinity of the image forming apparatus. This can prevents another user from accidentally getting the printed matter.

As such, with the arrangement described above, it becomes possible to realize a control device which (i) authenticates a user in an easy way in which impersonation can be prevented without inconvenient operation, and (ii) prevents another user from accidentally viewing a printed matter.

Further, the control device of the present invention preferably includes a start-up control section for activating the image forming means if the data checking section confirms that the receiving means receives the print data added with the user identification information specified by the user specifying section.

The image forming processing is started if the data checking section confirms that the receiving means receives the print data added with the user identification information specified by the user specifying section. In other cases, it is unclear whether or not the image forming apparatus starts printing an image. With the arrangement, it is possible to activate the image forming means only when an image is formed. This can prevent unnecessary electric power consumption from being generated in the image forming means.

Furthermore, the control device of the present invention preferably includes a movement judging section for judging whether or not the user having the face approaches the image forming apparatus, based on temporal changes in position and size of the face, the position and size being detected by the face position detecting section. Further, if the movement judging section judges that the user approaches the image forming apparatus, the face recognition processing section preferably starts the extraction processing.

With the arrangement, a user can be identified before reaching the image forming apparatus. This makes it possible to start the processing of the control device and the image forming apparatus earlier. For example, in a case where after the user is specified, the image is formed based on print data added with the user identification information, it is possible to start the image forming on an earlier stage. In a case where after the user is specified, a list of the print data added with the user identification information is displayed on the display device, it is possible to start the display processing on an earlier stage.

Furthermore, in the control device of the present invention, if it is confirmed that the receiving means receives the print data added with the user identification information specified by the user specifying section, the data checking section preferably operates a display device to display a screen showing a list of the print data, and also operates the image forming means to form an image based on the print data indicated by a selection instruction inputted into an input device.

With the arrangement, a user can select/cancel necessary/unnecessary print data among the print data on the print instruction that the user has issued, when coming in front of the image forming apparatus. In other words, it is possible to carry out the operation for each print data efficiently.

Moreover, the control device of the present invention preferably includes a display control section for (i) determining authority information associated with the user identification information specified by the user specifying section, the display control section determining the authority information by referring to second associated information in which user identification information is associated with authority information that indicates authority to operate the image forming apparatus, which authority a user identified by the user identification information has, and (ii) operating the display device to display an operation screen according to the authority indicated by the authority information.

Here, the operation authority is the authority to use each function of the image forming apparatus. In a case of an image forming apparatus having a plurality of functions, such as copying, faxing, and scanning, the image forming apparatus may be arranged, for example, such that a user can use only a function of copying, and another user can use all the functions.

With the arrangement, it is possible for the control device to operate the display device to display a screen according to user's operation authority without requiring the user to input an inconvenient password or the like, or carry a card or the like.

An image forming apparatus of the present invention includes: a receiving means for receiving print data from a terminal connected with the image forming apparatus via a network; image forming means for forming an image of the print data on recording paper; a capturing device for capturing a user who is an operator; and the control device described above.

With the arrangement, it becomes possible to realize an image forming apparatus which (i) authenticates a user in an easy way in which impersonation can be prevented without inconvenient operation, and (ii) prevents another user from accidentally viewing a printed matter.

The control device can be realized by a computer. The scope of the present invention includes: such a program that realizes the control device on a computer by operating the computer to function as each of the means described above; and a computer-readable medium that stores such a program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A control device for controlling an image forming apparatus including (a) receiving means for receiving print data from a terminal connected with the image forming apparatus via a network, and (b) image forming means for forming an image of the print data on recording paper, the image forming apparatus being provided with a capturing device for capturing a user who is an operator, the print data being added with user identification information for identifying the user, the control device comprising:

a face position detecting section for detecting a position of a user's face in an image captured by the capturing device;

a movement judging section for judging whether or not the user having the face approaches the image forming apparatus, based on temporal changes in position and size of the face, the position and size being detected by the face position detecting section;

a face recognition processing section for, in a case where the movement judging section judges that the user approaches the image forming apparatus, (i) checking a partial image against reference face images, the partial image being at the position detected in the captured image by the face position detecting section, the reference face images being users' face images stored in advance; and (ii) extracting a reference face image that matches the face in the partial image;

a user specifying section for specifying user identification information that corresponds to the reference face image extracted by the face recognition processing section, the user specifying section specifying the user identification information by referring to primary associated information in which a reference face image is associated with user identification information for identifying a user who has a face indicated by the reference face image;

a data checking section for (i) checking whether or not the receiving means receives the print data added with the user identification information specified by the user specifying section, and (ii) if it is confirmed that the receiving means receives the print data, operating a display device to display a screen showing a list of the print data, and operating the image forming means to form an image based on the print data indicated by a selection instruction inputted into an input device; and a start-up control section for activating the image forming means if the data checking section confirms that the receiving means receives the print data added with the user identification information specified by the user specifying section.

2. The control device according to claim 1, further comprising:

a display control section for (i) determining authority information associated with the user identification information specified by the user specifying section, the display control section determining the authority information by referring to second associated information in which user identification information is associated with authority information that indicates authority to operate the image forming apparatus, which authority a user identified by the user identification information has, and (ii) operating the display device to display an operation screen according to the authority indicated by the authority information.

3. An image forming apparatus comprising:

receiving means for receiving print data from a terminal connected with the image forming apparatus via a network;

image forming means for forming an image of the print data on recording paper;

a capturing device for capturing a user who is an operator; and a control device, the print data being added with user identification information for identifying the user, the control device comprising:

a face position detecting section for detecting a position of a user's face in an image captured by the capturing device;

a movement judging section for judging whether or not the user having the face approaches the image forming apparatus, based on temporal changes in position and size of the face, the position and size being detected by the face position detecting section;

a face recognition processing section for, in a case where the movement judging section judges that the user approaches the image forming apparatus, (i) checking a partial image against reference face images, the partial image being at the position detected in the captured image by the face position detecting section, the reference face images being users' face images stored in advance; and (ii) extracting a reference face image that matches the face in the partial image;

a user specifying section for specifying user identification information that corresponds to the reference face image extracted by the face recognition processing section, the user specifying section specifying the user identification information by referring to primary associated information in which a reference face image is associated with user identification information for identifying a user who has a face indicated by the reference face image;

a data checking section for (i) checking whether or not the receiving means receives the print data added with the user identification information specified by the user specifying section, and (ii) if it is confirmed that the receiving means receives the print data, operating a display device to display a screen showing a list of the print data, and operating the image forming means to form an image based on the print data indicated by a selection instruction inputted into an input device; and a start-up control section for activating the image forming means if the data checking section confirms that the receiving means receives the print data added with the user identification information specified by the user specifying section.

4. A method of controlling an image forming apparatus including receiving means for receiving print data from a terminal connected with the image forming apparatus via a network, and image forming means for forming an image of the print data on recording paper, the image forming apparatus being provided with a capturing device for capturing a user who is an operator, the print data being added with user identification information for identifying the user, the method comprising the steps of:

(I) detecting a position of a user's face in an image captured by the capturing device;

(II) judging whether or not the user approaches the image forming apparatus, based on temporal changes in position and size of the face, the position and size being detected;

(III) if it is judged that the user approaches the image forming apparatus, (i) checking a partial image against reference face images, the partial image being at the position detected in the captured image in the step (I), the reference face images being users' face images stored in advance; and (ii) extracting a reference face image that matches the face in the partial image;

(IV) specifying user identification information that corresponds to the reference face image extracted in the step (III), the user identification information specified by referring to primary associated information in which a reference face image is associated with user identification information for identifying a user who has a face indicated by the reference face image;

(V) checking whether or not the receiving means receives the print data added with the user identification information specified in the step (IV), and if it is confirmed that the receiving means receives the print data, operating a display device to display a screen showing a list of the print data, and operating the image forming means to form the image based on the print data indicated by a selection instruction inputted into an input device; and (VI) a start-up control section for activating the image forming means if the data checking section confirms that the receiving means receives the print data added with the user identification information specified by the user specifying section.

5. A computer-readable recording medium in which a program for causing a computer to function as each of sections of a control device for controlling an image forming apparatus is stored, the control device for controlling an image forming apparatus including (a) receiving means for receiving print data from a terminal connected with the image forming apparatus via a network, and (b) image forming means for forming an image of the print data on recording paper, the image forming apparatus being provided with a capturing device for capturing a user who is an operator, the print data being added with user identification information for identifying the user, the control device comprising:

a face position detecting section for detecting a position of a user's face in an image captured by the capturing device;

a movement judging section for judging whether or not the user having the face approaches the image forming apparatus, based on temporal changes in position and size of the face, the position and size being detected by the face position detecting section;

a face recognition processing section for, in a case where the movement judging section judges that the user approaches the image forming apparatus, (i) checking a partial image against reference face images, the partial image being at the position detected in the captured image by the face position detecting section, the reference face images being users' face images stored in advance; and (ii) extracting a reference face image that matches the face in the partial image;

a user specifying section for specifying user identification information that corresponds to the reference face image extracted by the face recognition processing section, the user specifying section specifying the user identification information by referring to primary associated information in which a reference face image is associated with user identification information for identifying a user who has a face indicated by the reference face image;

a data checking section for (i) checking whether or not the receiving means receives the print data added with the user identification information specified by the user specifying section, and (ii) if it is confirmed that the receiving means receives the print data, operating a display device to display a screen showing a list of the print data, and operating the image forming means to form an image based on the print data indicated by a selection instruction inputted into an input device; and a start-up control section for activating the image forming means if the data checking section confirms that the receiving means receives the print data added with the user identification information specified by the user specifying section.

* * * * *